C. N. SMITH.
MACHINE FOR MAKING STEREOTYPE MOLDS.
APPLICATION FILED JULY 5, 1917.

1,379,317.

Patented May 24, 1921.
4 SHEETS—SHEET 3.

Witness:
Leo Dumas.

Inventor:
Christian N Smith
By Harry Irwin Cromer
Atty.

UNITED STATES PATENT OFFICE.

CHRISTIAN N. SMITH, OF ELGIN, ILLINOIS.

MACHINE FOR MAKING STEREOTYPE-MOLDS.

1,379,317. Specification of Letters Patent. Patented May 24, 1921.

Application filed July 5, 1917. Serial No. 178,855.

*To all whom it may concern:*

Be it known that I, CHRISTIAN N. SMITH, a citizen of the United States, residing in Elgin, in the county of Kane and State of Illinois, have invented certain new and useful Improvements in Machines for Making Stereotype-Molds, of which the following is a specification.

This invention relates to that class of machines which are adapted to be used for making molds or matrices suitable for use in casting stereotype plates for printing purposes.

The principal object of the invention is to provide a simple, economical and efficient machine for making or tamping molds or matrices for use in making stereotype plates.

Other and further objects of the invention will appear from an examination of the following description and claims, and from an inspection of the accompanying drawings, which are made a part hereof.

The invention consists in the features, combinations, parts, and details of construction herein described and claimed.

In the accompanying drawings, Figure 1 is a view in front elevation of a machine for making stereotype molds, constructed in accordance with my invention and improvements;

In constructing a machine for making or tamping stereotype molds or matrices, in accordance with my invention and improvements, I provide a main frame 1, having upright frame members 2, at opposite ends thereof, and having transverse frame members 3 connected with said upright end frame members and provided with intermediate upright frame members 4, 4, and longitudinal horizontal frame members 5 and 6 connected with the end frame members, and with the intermediate upright frame members and all forming a strong and rigid structure or frame-work, adapted to withstand the stresses and strains to which the mechanism is subjected in use. A strong upright column 7 extends upward from the base 8 of the frame and is provided at its upper extremity with a forwardly projecting angular portion 9, in the form of a rigid cantaliver arm or bracket which projects forward over the central portion of the main frame, and at a sufficient distance above the top or table supporting members 6 of the main frame to provide a suitable space for enabling a movable table, with a type form, and material for making a stereotype mold, and tamping or mold forming mechanism to be mounted over the main frame and between the top of the main frame and the upper extremity of the forwardly projecting arm or bracket 9. The column 7 is rigidly connected at its front side with the main frame, in any desired, suitable, or well known manner, and is provided with an intermediate rigid forwardly projecting bracket or arm 10 secured to and supported by the column 7, and located in position to extend forward over the main frame and between the latter and the upper extremity of the arm 9. The bracket or arm 10 is firmly secured in rigid relation to the column 7 by means of flanges 11 on the bracket member, and projecting shoulders or flanges 12 on the column, and connecting bolts or screws 13, which extend through said flanges and serve to firmly secure them together. The bracket arm 10 has braces 14, which are, by preference, cast in one integral piece with the arm 10 and its base or flange 11, and serves to strengthen the bracket or arm.

A form supporting table 15 is reciprocatingly mounted upon the main frame in position to move from end to end of the latter, and to form a support for a type form to be mounted upon and movably supported by such table during the operation of tamping or making a stereotype mold or matrix. The movable table or bed 15 is, by preference, connected in slidable relation to the main frame by means of parallel longitudinal guiding tracks or tongues 17 on the upper sides of the upper main frame members 6, which tongues or guiding tracks extend into and are tapered to fit in sliding engagement with dove-tailed slots or grooves 18 in the corresponding marginal portions and bottom of the movable table or bed 15.

Figure 3:
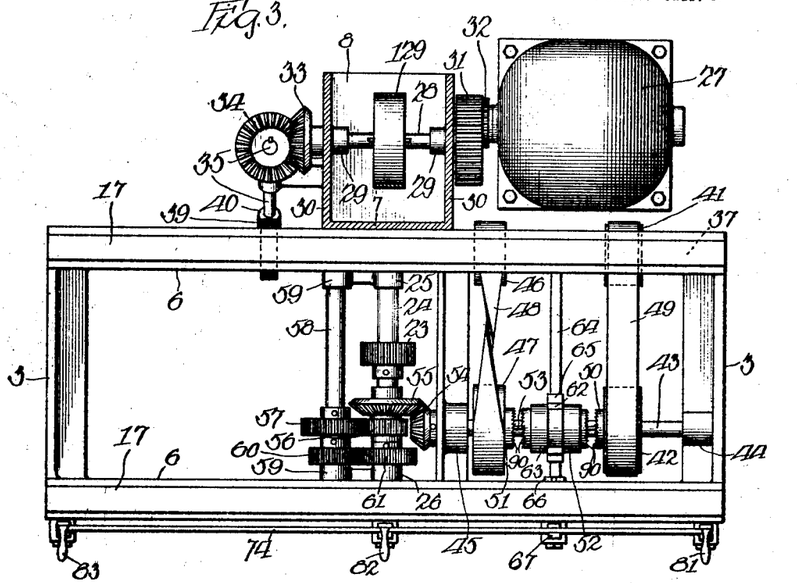
Fig. 3, a view in horizontal section, taken on line 3 of Fig. 2, looking downward.

The movable table or bed 15 is provided with a longitudinally extending toothed rack 19 secured to the bottom of the table by means of screws or bolts 20, or other suitable securing means. The rack extends between and in parallel relation to the guiding tracks or tongues 17 on the main frame, and is, by preference, provided with lateral flanges 21 through which the securing screws or bolts extend into a depending boss or rib 22 upon the bottom of the table 15. A toothed gear wheel 23, shown in Fig. 3, is mounted in fixed engagement with a driving shaft 24, which is rotatably mounted in suitable bearings 25, 26, in the main frame, and extends transversely across the central portion of the main frame. (See Fig. 3.)

Figure 4:
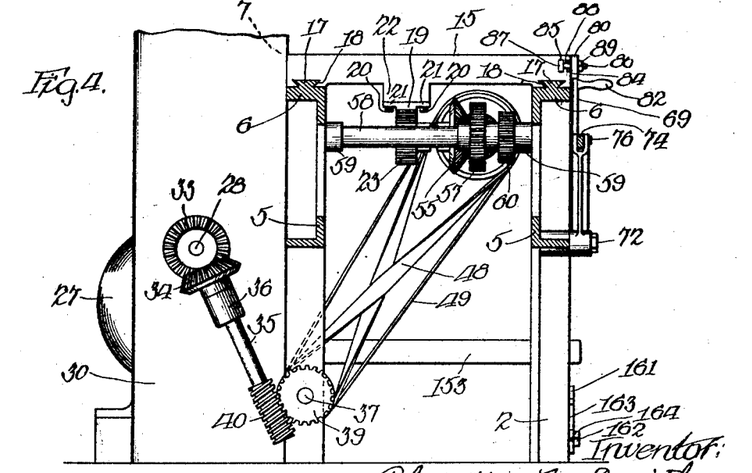
Fig. 4, a view in transverse vertical section, taken on line 4 of Fig. 1, looking in the direction indicated by the arrows.

The driving shaft 24 is operatively connected with a suitable source of power such, for instance, as a motor 27, and is provided with suitable means for enabling the direction of rotation of the shaft 24, and its rack engaging gear wheel 23, and the movement of the reciprocating table 15 to be reversed, either automatically or by manual operation of the reversing mechanism. In order to accomplish this, the main drive shaft 28 rotatively mounted in suitable bearings 29 in frame portions 30 fixed to the main frame, is provided at one end with a toothed gear wheel 31 fixed to said shaft and in toothed engagement with a gear wheel or pinion 32 fixed to the motor shaft. A beveled gear 33 is fixed to the opposite extremity of the shaft 28 and is in toothed engagement with a similar beveled gear 34, which is fixed to a shaft 35, rotatively mounted in bearings 36 in the main frame. A counter shaft 37, which is rotatively mounted in suitable bearings 38 in the main frame and in position to extend longitudinally of the main frame, is operatively connected with the shaft 35 by means of suitable gear mechanism, which may be in the form of a toothed gear or worm wheel 39 fixed to the shaft 37, and a worm 40 fixed to the shaft 35 and in toothed engagement with the worm wheel 39. A belt pulley 41 is fixed to the shaft 37 and is operatively connected with a belt pulley 42, upon and in rotative relation to a shaft 43 which is mounted in parallel relation to the shaft 37 in suitable bearings 44 and 45 in the main frame. (See Figs. 1, 3 and 4.)

A belt pulley 46 is fixed to the shaft 37, and operatively connected with a belt pulley 47, which is mounted upon and in rotative relation to the shaft 43. A cross belt 48 is mounted upon and forms a connection between the pulleys 46 and 47, and a belt 49, which is not crossed, is mounted upon and forms a connection between the belt pulleys 41 and 42. The belt pulley 42 is provided with a clutch member 50 fixed thereto; and the pulley 47 has a similar clutch member 51 fixed to its central portion and encircling the shaft 43 and with its clutch-engaging face opposite the similar clutch-engaging face of the clutch member 50. A clutch member 52 is mounted upon and movable longitudinally with respect to the shaft 43, with which it is connected by means of a spline or feather 53 in such a manner that the clutch member 52 will rotate with, but is adapted to be moved longitudinally of the shaft 43, into and out of clutching engagement with the clutch members 50 and 51, respectively, in alternate order as desired. It is obvious that the clutch member 52 is out of engagement with both of the clutch members 50 and 51, when said clutch member 52 is in neutral position midway between the clutch members 50 and 51, as shown in Fig. 3. A beveled pinion 54 is fixed to the shaft 43 in position to engage a beveled gear wheel 55, which is loosely mounted upon or in rotative relation to the rotative shaft 24, already described, which shaft is in fixed relation to the gear wheel 23 which engages the rack 19 on the movable table. A toothed spur gear wheel 56 is fixed to the beveled gear wheel 55 and loosely encircles, and is in rotative relation to the shaft 24, and in toothed engagement with a spur gear wheel 57, which is fixed to a shaft 58, rotatively mounted in suitable bearings 59 in the main frame. This shaft 58 is adjacent to and in parallel relation with the shaft 24, and is provided with a spur gear wheel 60 fixed to the shaft 58 and in toothed engagement with a similar spur gear wheel 61 which is fixed to the rotative shaft 24.

A clutch operating member 62, which may be in the form of a yoke which embraces the clutch member 52 and extends into a peripheral groove 63, is mounted in operative engagement with the clutch member 52, and operatively connected with suitable tripping mechanism. The clutch operating or tripping mechanism, when constructed as shown in the drawings, comprises a rock shaft 64, which is operatively connected with and adapted to reciprocate the yoke 62 with which it is connected by means of a lever 65 fixed to said shaft, and connected with or forming part of the yoke. The shaft 64 is rockingly mounted in suitable bearings 66 in the frame, and provided with a lever or crank arm 67 fixed to said shaft. Levers 68, 69 and 70 are pivotally mounted upon the main frame by means of pivots 71, 72 and 73, respectively, and are connected by means of a connecting rod 74, which extends longitudinally of the machine and is pivotally connected with the trip levers 68, 69 and 70 by means of pivots 75, 76 and 77. (See Figs. 1, 2 and 3.) The connecting rod 74 has a vertically elongated slot or socket 78 into which extends a crank pin 79, which is fixed to the crank arm 67, and a trip or stop 80 is adjustably mounted upon the reciprocating table 15 in position to engage and operate successively a plurality of the trip levers above described. The trip levers 68, 69 and 70 are all connected by means of the connecting rod 74, in such a manner that said levers all operate simultaneously and move in parallel relation when the upper extremity of either of said trip levers is engaged and operated by the trip or stop 80. The trip levers are also provided with handles 81, 82 and 83, one for each of said levers, and all operate together when either of the levers is operated manually. The stop or trip member 80 is adjustably attached to the reciprocating table 15 by means of a boss or tongue 84 upon the stop member, a dovetailed or tapered longitudinal groove 85 in the table, and a flanged or headed securing member which may be in the form of a bolt 86, extending through the stop 80 and having a head or flange portion 87 in sliding engagement with the groove 85, and with flanges 88 on opposite sides of said groove in position to retain the headed securing member or bolt 86 in operative position and in sliding engagement with the walls of the groove. A nut 89 is mounted in threaded engagement with the bolt 86. The nut and bolt are thus adapted to secure the stop 80 in fixed relation to the table 15 in any position into which the stop is adapted to be moved or adjusted. The clutch members 50, 51 and 52 are provided with shoulders or teeth 90, which are adapted to enable the movable clutch member 52 and the shaft 43 to be rotated in one direction, when the clutch member 52 is in engagement with the clutch member 50, and in an opposite direction when the clutch member 52 is in engagement with the oppositely rotative clutch member 51 on the belt pulley 47, which is operated by the crossed belt 48. (See Figs. 1, 3 and 4.) With the mechanism and parts constructed and arranged as above described, it is obvious that with the trip levers and clutch member 52 in intermediate neutral or normal initial position, in which they are shown in Figs. 1 and 3, and with the reciprocating table 15 and stop 80 in the position in which they are shown in Fig. 1, the table will remain stationary, although the motor and the driving mechanism connected with the motor and by means of which the belt pulleys 42 and 47 are rotated in opposite directions, may be in operation. The motor and the driving mechanism, by means of which the pulleys 42 and 47 are driven in opposite directions of rotation, being set in operation, it is obvious that the movement of the trip levers 68, 69 and 70 and the crank arm 67, to the right, from the position in which they are shown in Fig. 1 and Fig. 3, will cause the clutch member 52 to engage clutch member 50 on the pulley wheel 42 and thereby cause the shaft 24 and gear wheel 23, which is in toothed engagement with the toothed rack 19 on the table 15, to rotate in the direction which will cause the table 15 to move toward the left from the position in which it is shown in Fig. 1, and to continue such movement of the table until the stop 80 is brought into engagement with the upper extremity of the trip lever 69, thereby causing the trip lever mechanism and the clutch member 52 to be shifted toward the left so as to bring the clutch member 52 into engagement with the clutch member 51 on the belt pulley 47, thereby reversing the direction of rotation of the shaft 24 and rack engaging gear wheel 23, and the direction of movement of the table—unless the tripping lever mechanism shall have been thrown to initial or neutral position, or into position to disengage the clutch members 52 and 50, by hand. It is obvious that the clutch operating or tripping mechanism is adapted to be operated by hand so as to connect the clutch member 52 with either of the clutch members 50 or 51, or to disconnect it from both of said clutch members, whenever desired, thus enabling the direction of movement of the table 15 to be reversed by the operator, by the manual operation of the tripping mechanism, whenever desired. It is also obvious that the table operating mechanism, and tripping mechanism is adapted to enable the table to be moved in opposite directions alternately, and its direction of movement to be automatically reversed, as already suggested.

A vertically movable reciprocating plunger 91 is slidably mounted in a bearing 92' in the bracket arm 10 directly over the central portion of the main frame, and in position to permit the table 15, and a type form, and material for making a stereotype mold laid upon such type form and to be operated upon, to pass beneath the plunger, or tamping mechanism, during the operation of tamping or forming the mold.

The plunger 91 comprises in its construction an outer sleeve or hollow plunger member which is provided at its upper extremity, with a transverse head 92, and an inner lower plunger member or rod 93 which is mounted in telescoping or slidable engagement with the sleeve member or main upper plunger member 91. A tool-supporting member, which is, by preference in the form of a transverse head 94, is secured to the bottom extremity of the lower plunger member or rod 93, by means of a securing pin 95, or other suitable securing means. A tamping or mold-forming tool 96 is mounted upon and movable upward and downward with the head 94, in position to extend over and transversely with respect to the path of movement of the reciprocating table 15. The tool is, by preference, provided with an upper body portion or securing member 97, which may be formed of metal, such as aluminum, or similar strong material, suitable for holding the mold-engaging toothed or similarly constructed bottom portion of the tamping tool in position upon the head or plunger. Securing means, such as screws 98 anchored in the head and adapted to securely hold the tool in position, may be employed either with or without glue or other adhesive or similar securing means. I prefer, however, to provide the tamping tool 96 with an upper body portion or upwardly and outwardly extending longitudinal tongue 100 which is adapted to extend into a downwardly and inwardly tapered recess or groove 99 in the bottom of the member 97, or into a similar recess in the head, if desired. The tamping tool may, however, be secured in position by means of strong glue, or any desired suitable or well known securing means. The tamping tool 96, which is, by preference formed of flexible material such as rubber or a composition of similar flexible material, has a series of teeth 101 of rubber or bristles or similar flexible material, on its under side adapted to engage and tamp the pulp or papier mâché or material of which the mold is to be formed, into shape and into contact with the type or form so as to form the matrix or mold. The teeth have spaces 102 therebetween. Vertical guide rods 103, secured to the head 94, extend upward through and in movable relation to suitable bearings 104 in the bracket arm 10, already described. The guiding rods 103 are located on opposite sides of the plunger, and are adapted to guide the tool supporting head and tamping tool during the operation of tamping or making molds or matrices of papier mâché, pulp or other similar material. The plunger members 91 and 93 are connected in telescoping or relatively movable relation to each other and are provided with spring mechanism adapted to permit and yieldingly resist the downward movement of the plunger member 91 after the lower plunger member 93 and the head 94 and tamping tool 96 have reached the limit of their downward movement in the operation of tamping or making a mold. The telescoping parts of the plunger are thus yieldingly connected by means of a spring 105 which is interposed between the upper end 106 of the enlarged lower portion of the plunger member 93, and a ring or cap 107, which is secured in fixed relation to the plunger member or sleeve 91, and, by preference, in threaded engagement with the latter. The plunger member 93 has an upper stem portion 108 which extends above and may be integral with the relatively large lower plunger member 93, and is encircled by the spring 105, already described. This stem 108 extends upward through an axial opening 109 in the cap 107, and a compressible spring 110 is interposed between the perforated cap portion 107 and a collar 111, which is secured in fixed relation to the stem 108 by means of a nut 112 mounted in threaded engagement with the stem, and adapted to be adjusted so as to increase or decrease the tension of the spring mechanism, as desired. With the plunger parts and tool supporting head constructed and arranged as described, it is plain that the plunger member 93 and the head 94, with the tamping tool 96 supported thereon, are adapted to vibrate with respect to the plunger member 91 when the mechanism is in operation and moving upward and downward rapidly during the operation of tamping or forming a mold or matrix.

In order to provide means for operating the plunger and thereby the mold forming or tamping tool, an eccentric 113 is fixed to a shaft 114, which is rotatively mounted in suitable bearings 115 in the arm 9 which extends over the main frame and movable table. A pitman 116 is operatively connected with the eccentric by means of an eccentric strap 117, which is secured to the upper extremity of the pitman by means of a neck 118 and securing pin 119, or similar suitable securing means. The pitman is operatively connected with the cross-head 92 of the plunger 91 by means of a yoke 120, having forked arms 121 pivotally connected with the cross-head 92 by means of a transverse pivot 122, which extends through suitable perforations in said cross-head and forked arms. The upper extremity of the yoke 120 is mounted, by preference, in threaded engagement with the pitman 116; and a securing nut 123 is mounted in threaded engagement with the pitman and in securing engagement with the yoke 120. A belt pulley 124 is fixed to the shaft 114 and is operatively connected with a belt pulley 125 on a countershaft 126 by means of the belt 127. The countershaft 126 is rotatively mounted in suitable bearings in the frame or vertical column 7, and is operatively connected with the main drive shaft 28, already described, by means of a belt pulley or wheel 128 fixed to the shaft 126, and a belt pulley 129 fixed to the rotative shaft 28, and a cross belt 130 mounted upon and operatively connecting said pulleys. A pair of brackets or roller supporting frames are mounted upon the arm 10, for supporting a pair of rollers in position to engage the material of which the stereotype molds are to be formed. These roller supporting frames comprise a pair of upright arms or rods 131, 131, mounted in sockets 132, located on opposite sides of and above the main frame, and adjacent to the opposite ends of the tamping tool or brush 96, already described. Bracket arms 133, 133 are fixed to the lower extremity of each upright rod or bar 131. These arms 133 extend outward laterally with respect to the tamping brush or tool 96 on opposite sides of said tool, and are located on opposite sides of the main frame, and in position to rotatively support a pair of pressing rollers 134 rotatively on opposite side of the tamping brush or tool 96, and in position to engage and hold in position material laid on a form, and to be operated upon in making a mold or matrix.

The rollers 134 are, by preference, in the form of cylinders 135 of flexible compressible material, such, for instance, as rubber, mounted upon and encircling a metallic core or body 136, forming an axle for each of said rollers respectively. The axles of the rollers are journaled in suitable bearings 137 in vertically movable or adjustable supporting stems or plungers 138, each of which is slidably supported in a suitable opening or bearing 139 in an arm 133. Each stem or plunger 138 is provided with a collar 140, and a compressible spring 141 encircles each plunger, and is interposed between the collar 140 and an inner flange or shoulder 141' on the corresponding bracket arm 133, or other suitable abutment, in position to cause the springs located at opposite ends of the rollers 134, respectively, to press the rollers downward yieldingly against the top surface of the papier mâché or material of which a mold is to be formed, so as to hold the material in position in contact with the surface of the type form while the material and type form are passing beneath the tamping or forming tool or brush 96 located between the rollers 134, during the operation of tamping or forming a mold or matrix. An adjusting nut 142, and a lock nut 143 in threaded engagement with each plunger or roller-supporting stem 138, respectively, are adapted to enable the tension of the springs 141 to be increased or diminished, as desired.

Figure 2:
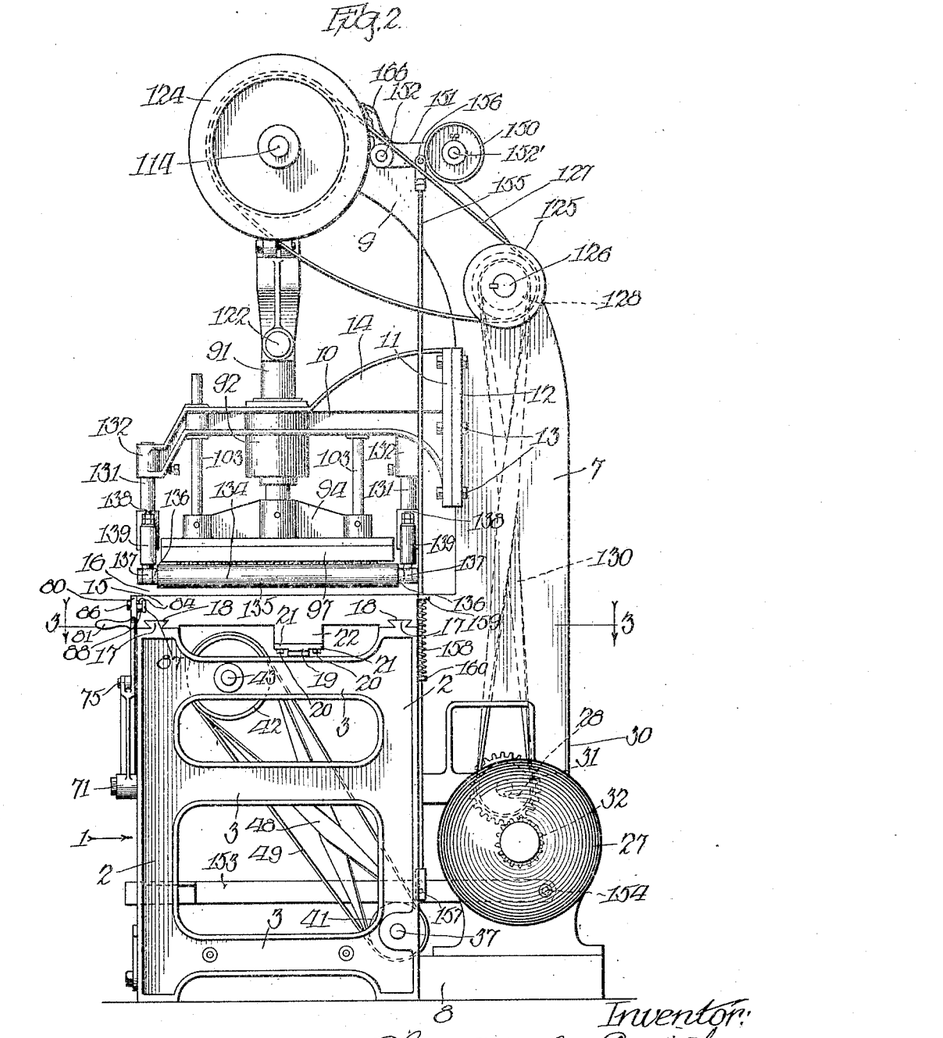
Fig. 2, a view in end elevation, of the machine shown in Fig. 1.

In order to provide means for enabling the plunger and tamping tool to be set in operation or stopped with facility when desired, and without the necessity of stopping the motor or main driving shaft, a belt-engaging member which may be in the form of a wheel 150 is mounted upon a movable support consisting of a belt-tightening and releasing lever 151 pivotally supported in position by means of a pivot 152, and provided with a stub shaft or axle 152' upon which the wheel 150 is rotatively mounted. A collar fixed to the end of said shaft serves to retain the wheel upon the shaft. An operating lever 153, which is, by preference, in the form of a foot lever pivotally mounted upon a pivot 154 is operatively connected with the lever 151 by means of a connecting rod 155, the upper end of which is connected with the lever 151 by a pivot 156, and the lower end of which is connected with the lever 153 by means of a pivot 157. A compressible spring 158 encircles the connecting rod and is in engagement with a collar or shoulder 159 on said rod; and the opposite end of the spring engages an abutment 160 upon the frame of the machine. The spring is thus adapted to tend to press the rod 155 upward, so as to raise the belt-tightening lever 151 and idler 150 to releasing position, and hold the operating lever 153 in raised initial or releasing position, as shown in Fig. 2.

A dog or catch 161, shown in Fig. 1, is pivotally supported by means of a pivot 162 in position to be moved into and out of engagement with the lever 153, so as to hold the latter down in belt-tightening position, and permit the raising of the lever to belt-releasing position, when the dog is moved out of engagement with the lever.

A spring 163 is mounted in position to engage and yieldingly hold the dog in engagement with the lever 153 when the latter is in lowered belt-tightening position; and a stop 164 is arranged in position to engage and limit the movement of the dog in the direction in which the latter is pressed by the spring. A guide 165, shown in Fig. 1, serves to guide the lever 153 in its upward and downward movements into and out of position to be engaged by the dog or catch 161.

In operation, a type form—not shown—is laid upon the reciprocating table 15, and covered with papier mâché or material of which the mold or matrix is to be formed. The table, with the type form and the material for forming the mold or matrix, being, for instance, in initial position, corresponding with the position of the table as shown in Fig. 1, and with the other parts of the machine in corresponding positions, the motor is started, and the clutch operating levers 68, 69 and 70, are moved from initial or neutral position in which they are shown in Fig. 1, to the right so as to cause the clutch member 52 to engage the clutch member 50 on the belt pulley 42, thereby causing the shaft 43 and the shaft 24 on which the rack-operating gear wheel 23 is mounted, to be rotated in the direction necessary to cause the reciprocating table with the type form and the material for making the mold in position thereon, to pass beneath the rollers 134 and the tamping tool 96 supported and operated by the plunger. The rollers serve to hold the material for forming the mold in such a manner that the material will lie flat upon the type surface of the type form or plate, and in position to be tamped or packed by the tamping tool or brush into contact with the faces of the type or characters upon the type plate or form, so as to form a mold or matrix corresponding with the type faces or characters to be molded or cast.

By pressing the operating lever or foot lever 153 downward from the position in which it is shown in the drawings, into position to be engaged and held down by the dog 161, the belt-tightening lever 151 and the belt-engaging idler wheel 150 are brought into operative engagement with the belt 127, and the belt being thus tightened, causes the belt pulley 124 and shaft 114 to rotate rapidly, thus causing the plunger which is connected with the eccentric 113 on the shaft 114 to be moved upward and downward with great rapidity, and, with them, the tamping tool or brush 96. The tamping tool or brush is thus caused to rapidly beat or tamp the material of which the mold is to be formed, during the operation of moving the type form and mold-forming material beneath the rapidly moving tool. By permitting the table 15 to move toward the left from the position in which it is shown in Fig. 1 until the trip or stop 80 on the table engages and operates the lever 69, the clutch member 52 will be thrown out of engagement with the clutch member 50 and into engagement with the clutch member 51 upon the belt pulley 47 which is operated by the crossed belt, and the direction of movement of the table, will thus be automatically reversed. (See Figs. 1 and 3.) The direction of movement of the table may be reversed by the manual operation of either of the clutch-operating levers 68, 69, and 70, whenever desired, as already explained. In order to stop the operation of the plunger and tamping tool, it is only necessary to release the foot lever 153, and thereby loosen the belt 127, so as to permit the plunger-operating shaft 114 and its eccentric to be disconnected from the source of power.

The material operated upon and of which the mold or matrix is to be formed is in a somewhat plastic condition during the operation of tamping or forming the mold, and may be in a slightly moistened condition and compressible. The material having been tamped or compressed into the desired form, the type form or plate, together with the mold or matrix-forming material thereon, is removed from the table and allowed to dry, or may be placed in an oven and artificially dried in any desired, ordinary or well known manner.

It is obvious that the shaft 114, which operates the plunger, is adapted to be connected with and disconnected from the main driving mechanism or source of power by means of an ordinary clutch upon the shaft 114, or equivalent ordinary and well known means. By employing means for tightening and loosening the belt 127 in the manner described, the use of such a clutch may be dispensed with.

Figures 5, 6, 7:
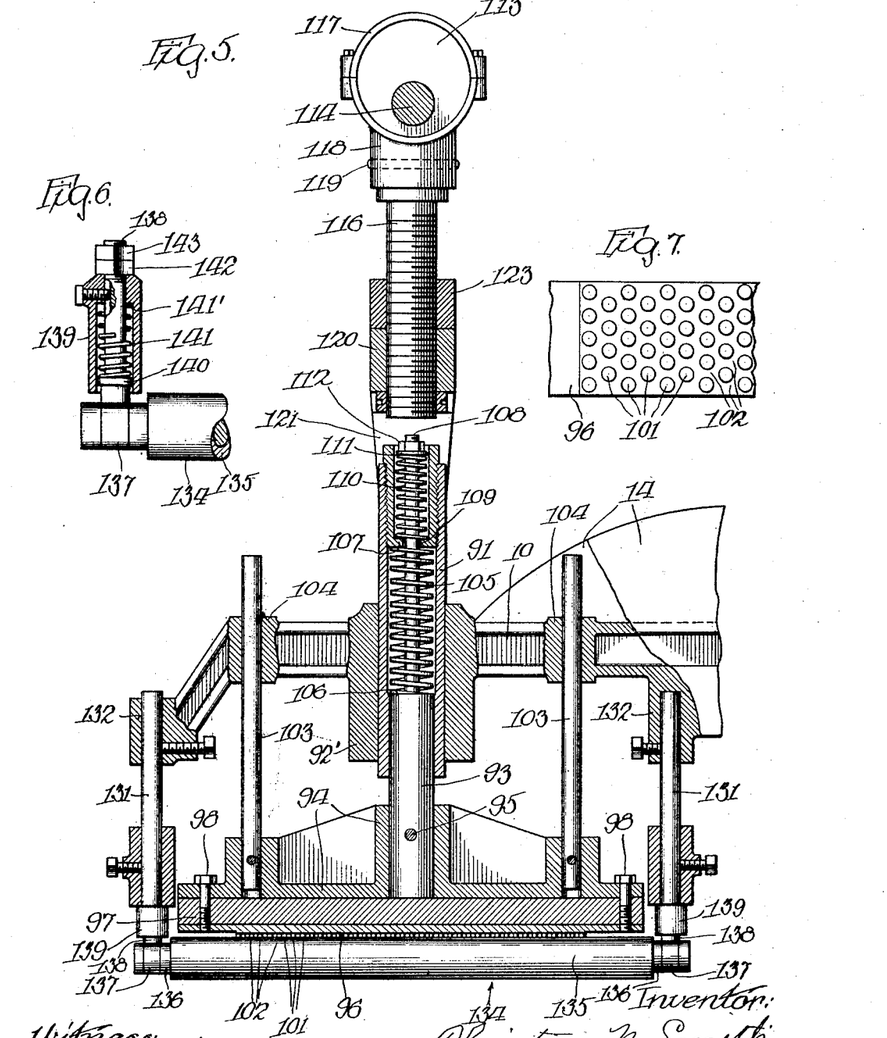
Fig. 5, an enlarged detail view in transverse vertical section, taken on line 5 of Fig. 1, looking in the direction indicated by the arrow, and showing the parts of the machine which are located above the type-form-supporting table.
Fig. 6, an enlarged detail view in vertical section taken on line 6, 6, of Fig. 1, looking in the direction of the arrow, and showing the means for yieldingly supporting the transverse rollers.
Fig. 7, an enlarged detail bottom plan view of a portion of the tamping tool which is moved into and out of contact with the material of which a mold or matrix is to be formed.

It is desirable that the tamping tool 96 should be adapted to stop in raised position, so as to be above the level of and out of contact with the material to be operated upon for forming the mold or matrix whenever the tool is standing still; and the head on which the tamping tool is mounted should vibrate upward and downward with respect to the main plunger member 91 when in operation. The spring 110 is maintained at such a tension as to hold the plunger member 93, head 94 and tamping tool 96 up against the tension of the compressed spring 105 in such a manner that the tamping tool 96 will be out of contact with the mold-forming material on the type form and beneath the tool even when the eccentric 113 is in its lowermost position or rotated one-half of a revolution from the position in which it is shown in Fig. 5. A brake 166 on the lever 151 is adapted to engage the pulley 124 when the lever is in belt releasing position, and to enable the shaft 114 to be stopped with the eccentric 113 and the plunger and tamping tool all in raised position, as indicated in Fig. 2.

I claim:

1. In a machine of the class described, the combination of a main frame, a reciprocating form-supporting table mounted on the main frame, a reciprocating tamping tool mounted above and movable upward and downward with respect to the table, for forming a mold, a reciprocating plunger, a tool supporting member mounted upon and in movable relation to the plunger and in supporting engagement with the tamping tool, spring mechanism in engagement with the plunger and operatively connected with said last mentioned tool-supporting member and acting to move the latter upward with respect to said plunger member, plunger-operating means for positively operating the plunger, and means for moving the table alternately in opposite directions beneath the reciprocating tamping tool, during the operation of the latter.

2. In a machine of the class described, the combination of a main frame, a reciprocating form-supporting table mounted on the main frame, a tamping tool mounted above and movable upward and downward with respect to the table, a tool-supporting head in supporting engagement with the tamping tool, a reciprocating plunger mounted in supporting engagement with and in movable relation to the tool-supporting head, spring mechanism interposed between the tool-supporting head and said plunger member, and adapted to permit and yieldingly resist the downward movement of the plunger member with respect to the tool-supporting head, spring mechanism operatively connected with the plunger and acting to move the tool-supporting head upward with respect to said relatively movable plunger member, means for reciprocating the plunger, and means for moving the table alternately in opposite directions beneath the reciprocating plunger and tamping tool, during the operation of the plunger.

3. In a machine of the class described, the combination of a main frame, a reciprocating form-supporting table mounted on the main frame, a reciprocating plunger mounted above and movable upward and downward with respect to the table, said plunger comprising in its construction upper and lower relatively movable telescoping members, spring mechanism in engagement with and adapted to permit and yieldingly resist the movements of said telescoping members with respect to each other in opposite directions alternately, a tamping tool mounted upon one of said telescoping plunger members and movable therewith upward and downward with respect to the other of said telescoping plunger members over the reciprocating table, and plunger operating mechanism operatively connected with the upper plunger member for positively operating the same.

4. In a machine of the class described, the combination of a main frame, a reciprocating form-supporting table mounted on the main frame, a vertically movable reciprocating plunger mounted above the form-supporting table and comprising in its construction a plurality of relatively movable telescoping members, spring mechanism in engagement with and adapted to permit and yieldingly resist the movement of said telescoping members with respect to each other in opposite directions alternately, a tamping tool mounted upon one of said telescoping plunger members and movable upward and downward therewith over the reciprocating table, plunger operating mechanism operatively connected with the other of said plunger members for positively reciprocating the same, and means for moving the table alternately in opposite directions beneath the tamping tool.

5. In a machine of the class described, the combination of a main frame, a reciprocating form-supporting table mounted on the main frame, a reciprocating plunger mounted above and movable upward and downward with respect to the table and comprising in its construction upper and lower relatively movable telescoping members, spring mechanism in engagement with and acting to move said relatively movable telescoping members with respect to each other in opposite directions alternately, a toothed tamping tool mounted upon one of said telescoping plunger members and movable upward and downward therewith over the reciprocating table, plunger operating mechanism operatively connected with the other of said plunger members for positively operating the same, and means for moving the table alternately in opposite directions beneath the reciprocating tamping tool.

6. In a machine of the class described, the combination of a reciprocating plunger comprising in its construction upper and lower relatively movable connected members, spring mechanism in engagement with and adapted to permit and yieldingly resist the movement of said relatively movable plunger members with respect to each other in opposite directions alternately, and means for reciprocating the plunger.

7. In a machine of the class described, the combination of a reciprocating plunger comprising in its construction upper and lower relatively movable connected plunger members, a spring in engagement with said relatively movable plunger members and acting to permit and yieldingly resist the downward movement of the upper plunger member with respect to the lower plunger member, a second spring operatively connected with said upper and lower plunger members and acting to move the lower plunger member upward with respect to the upper one of said relatively movable plunger members, and means for reciprocating the plunger.

8. In a machine of the class described, the combination of a reciprocating plunger comprising in its construction upper and lower relatively movable telescoping members, a spring in engagement with said telescoping plunger members and acting to permit and yieldingly resist the downward movement of the upper one of said telescoping plunger members with respect to said lower telescoping plunger member, a second spring in engagement with said upper and lower telescoping plunger members and acting to move the lower plunger member upward with respect to the upper telescoping plunger member, and a tamping tool mounted upon and movable upward and downward with the lower one of said telescoping plunger members.

9. In a machine of the class described, the combination of a reciprocating plunger comprising in its construction a pair of upper and lower relatively movable telescoping members, a spring in engagement and movable upward and downward with said telescoping plunger members and tending to move the lower one of said telescoping members downward with respect to the upper one of said telescoping members, a second spring in engagement and movable upward and downward with said telescoping members and tending to move the lower one of said telescoping members upward with respect to the upper one of said telescoping members and against the tension of the first-mentioned spring, a tamping tool mounted upon and movable upward and downward with the lower one of said telescoping plunger members, and plunger operating mechanism operatively connected with the upper one of said telescoping plunger members, for reciprocating the plunger.

10. In a machine of the class described, a reciprocating plunger comprising in its construction upper and lower relatively movable connected reciprocating plunger members, spring mechanism in operative engagement with and acting to yieldingly resist the downward movement of the upper plunger member with respect to the said lower plunger member, resilient means operatively connected with and acting to move said lower reciprocating plunger member upward with respect to the upper one of said relatively movable reciprocating plunger members, means for operatively connecting the upper one of said reciprocating plunger members with plunger-operating mechanism, and means for operatively connecting the lower one of said relatively movable reciprocating plunger members with a tool to be operated thereby.

Signed at Chicago, Illinois, June 28, 1917.

CHRISTIAN N. SMITH.

Witnesses:
HARRY IRWIN CROMER,
W. HARDING.